US012525733B2

(12) United States Patent
Nakamura

(10) Patent No.: US 12,525,733 B2
(45) Date of Patent: Jan. 13, 2026

(54) CONNECTOR AND CONNECTOR ASSEMBLY

(71) Applicant: Japan Aviation Electronics Industry, Limited, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 292 days.

(21) Appl. No.: 18/350,984

(22) Filed: Jul. 12, 2023

(65) Prior Publication Data

US 2024/0072462 A1 Feb. 29, 2024

(30) Foreign Application Priority Data

Aug. 31, 2022 (JP) ................................ 2022-137646

(51) Int. Cl.
*H01R 12/65* (2011.01)
*H01R 12/77* (2011.01)
*H01R 107/00* (2006.01)

(52) U.S. Cl.
CPC ........... *H01R 12/65* (2013.01); *H01R 12/774* (2013.01); *H01R 12/777* (2013.01); *H01R 2107/00* (2013.01)

(58) Field of Classification Search
CPC .... H01R 12/592; H01R 12/65; H01R 12/774; H01R 12/777
See application file for complete search history.

(56) References Cited

U.S. PATENT DOCUMENTS

| | | | | |
|---|---|---|---|---|
| 5,003,673 A * | 4/1991 | Nysten | A44B 17/0005 24/681 |
| 5,562,607 A * | 10/1996 | Gyory | A61N 1/0436 604/20 |
| 11,165,179 B2 * | 11/2021 | Komoto | H01R 12/777 |
| 11,177,597 B2 * | 11/2021 | Hashiguchi | H01R 12/592 |
| 11,646,507 B2 * | 5/2023 | Carlsson | H01R 9/20 439/37 |
| 2018/0233854 A1 * | 8/2018 | Komoto | H01R 12/69 |
| 2021/0104824 A1 * | 4/2021 | Hashiguchi | A44C 5/14 |

FOREIGN PATENT DOCUMENTS

| | | |
|---|---|---|
| EP | 3800739 A1 | 4/2021 |
| JP | 2018129244 A | 8/2018 |

* cited by examiner

*Primary Examiner* — Zheng Song
(74) *Attorney, Agent, or Firm* — MUNCY, GEISSLER, OLDS & LOWE, P.C.

(57) ABSTRACT

A connector includes a cylindrical, elastically deformable insertion portion that is inserted into a recess of a plug contact, the insertion portion having a contact portion placed on an outer peripheral surface of the insertion portion and a pressing portion placed on the outer peripheral surface of the insertion portion and on an opposite side to the contact portion across the fitting axis, part of a sheet-like connection target having a flexible conductor exposed on at least one surface being sandwiched between the pressing portion and an inner surface of the recess in a direction orthogonal to the fitting axis, the inner surface of the recess contacting a front surface of the connection target, and the pressing portion contacting a back surface of the connection target.

7 Claims, 10 Drawing Sheets

CONNECTOR AND CONNECTOR ASSEMBLY

BACKGROUND OF THE INVENTION

The present invention relates to a connector, and relates particularly to a connector to be connected to a sheet-like connection target in which a flexible conductor is exposed on at least one surface.

The present invention relates also to a connector assembly in which such a connector is attached to a connection target.

These days, what is called smart clothing, which can acquire biological information of a user such as a heart rate or a body temperature simply by wearing, has attracted attention. The smart clothing includes an electrode placed at a measurement point, and can transmit biological information to a wearable device as a measurement instrument by electrically connecting the wearable device to the electrode.

The connection between the electrode and the wearable device can be made by, for example, using a connector to be connected to a flexible conductor drawn out from the electrode.

As a connector of this type, for example, JP 2018-129244 A discloses a connector like that shown in FIG. 20. The connector includes a housing 2 and a base member 3 placed on both sides of a flexible board 1 with the flexible board 1 interposed therebetween; in the connector, a cylindrical portion 4A of a contact 4 is passed through a contact through hole 2A of the housing 2, and a flange 4B of the contact 4 is sandwiched between the housing 2 and a flexible conductor 1A exposed on a surface of the flexible board 1.

By pushing the base member 3 toward the housing 2 in this state, as shown in FIG. 21, a protrusion 3A of the base member 3 is inserted into a protrusion accommodating portion 4C of the contact 4 with the flexible substrate 1 interposed therebetween, and the inner surface of the protrusion accommodating portion 4C comes into contact with the flexible conductor 1A with a predetermined contact force, whereby the contact 4 is electrically connected to the flexible conductor 1A.

Further, as shown in FIG. 20, housing fixing posts 3B formed to protrude on the base member 3 are press-fitted into post accommodating portions 2B of the housing 2, and thereby the housing 2 and the base member 3 are fixed to each other.

By fitting a wearable device to the connector disclosed in JP 2018-129244 A, the wearable device can be connected to an electrode made of a flexible conductor.

However, when the flexible conductor 1A is exposed on the back surface of the flexible substrate 1, the connector of JP 2018-129244 A has a problem in that the flexible conductor 1A cannot be electrically connected to the contact 4.

SUMMARY OF THE INVENTION

The present invention has been made to solve such an existing problem, and an object of the present invention is to provide a connector and a connector assembly capable of electrically connecting a contact to a flexible conductor of a connection target regardless of whether the flexible conductor is exposed on the front surface or the back surface of the connection target.

A connector according to the present invention comprises:

a plug contact in a cylindrical shape having conductivity and having a recess extending along a fitting axis; and an inner contact having conductivity and having an insertion portion in a cylindrical shape which is elastically deformable, which is inserted into the recess, and through which the fitting axis passes, wherein the insertion portion includes: a contact portion that is placed on an outer peripheral surface of the insertion portion and that comes into contact with the plug contact in the recess; and a pressing portion placed on the outer peripheral surface of the insertion portion and on an opposite side to the contact portion across the fitting axis, and part of a sheet-like connection target having a flexible conductor exposed on at least one surface is sandwiched between the pressing portion and an inner surface of the recess in a direction orthogonal to the fitting axis, the inner surface of the recess comes into contact with a front surface of the connection target, and the pressing portion comes into contact with a back surface of the connection target, whereby the plug contact is directly electrically connected to the flexible conductor in a case where the flexible conductor is exposed on the front surface of the connection target, and the plug contact is electrically connected to the flexible conductor via the inner contact in a case where the flexible conductor is exposed on the back surface of the connection target.

DETAILED DESCRIPTION OF THE INVENTION

Hereinbelow, an embodiment of the present invention is described on the basis of the accompanying drawings.

Figure 1:
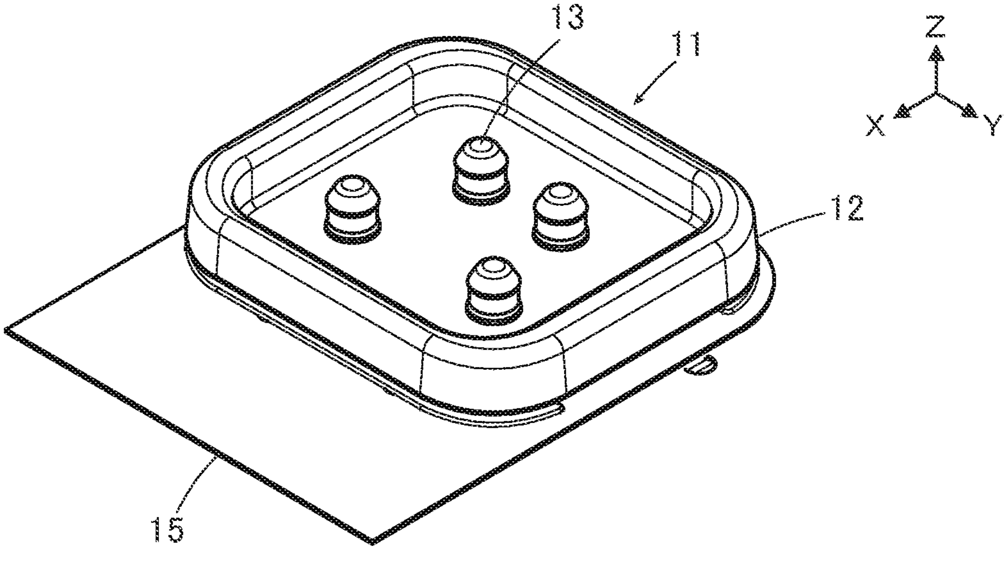
FIG. 1 is a perspective view showing a connector assembly according to an embodiment.

FIG. 1 shows a connector assembly according to an embodiment. The connector assembly includes a connector 11. The connector 11 is used as, for example, a garment-side connector for fitting a wearable device, and includes a housing 12 made of an insulating material. Four plug contacts 13 are held in the housing 12, and a sheet-like conductive member 15 is held by the housing 12. The sheet-like conductive member 15 forms a connection target to which the connector 11 is connected, and the connector 11 and the sheet-like conductive member 15 constitute a connector assembly.

The four plug contacts 13 are arranged in two rows parallel to each other in such a manner as to protrude perpendicularly to the sheet-like conductive member 15.

Here, for the sake of convenience, it is assumed that the sheet-like conductive member 15 spreads along an XY plane, and the arrangement direction of the four plug contacts 13 is referred to as a Y direction and the direction in which the four plug contacts 13 protrude is referred to as a +Z direction. The Z direction is a fitting direction in which the connector 11 is fitted to the other-side connector.

Figure 2:
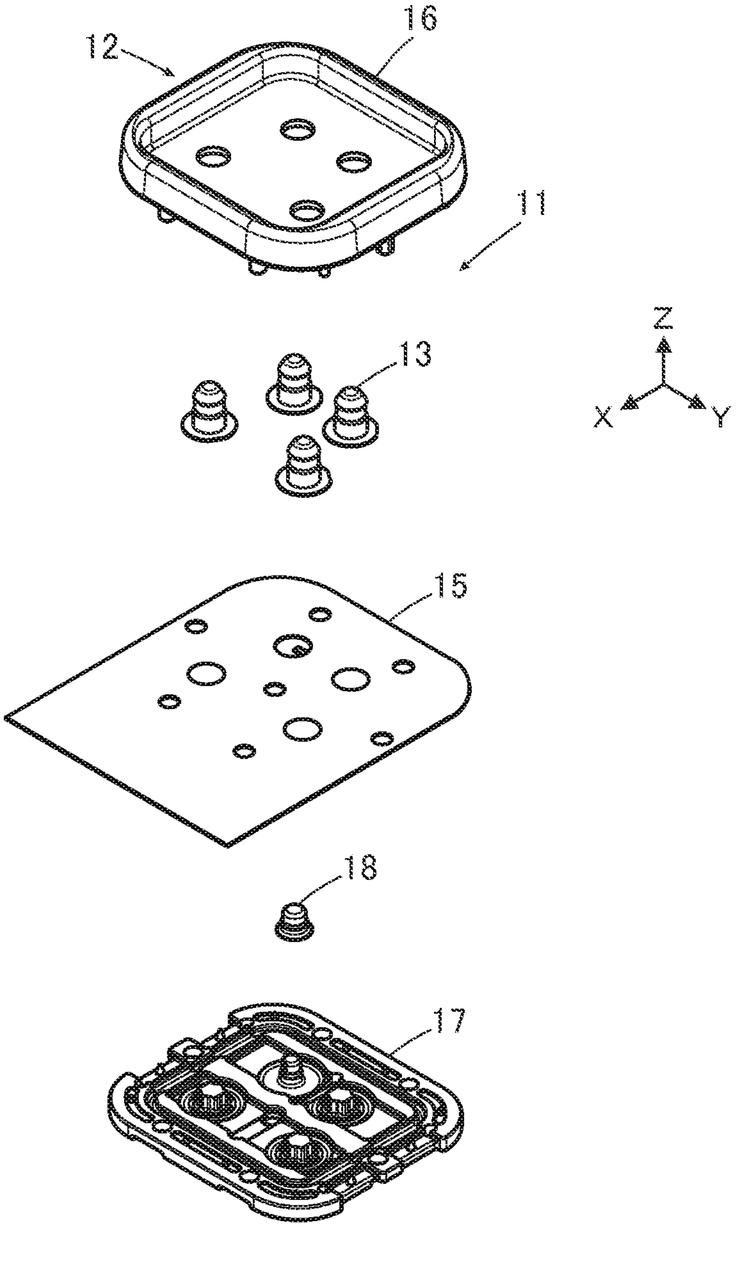
FIG. 2 is an exploded perspective view of the connector assembly according to the embodiment.

FIG. 2 is an exploded perspective view of the connector assembly. The connector 11 includes a top insulator 16 and a bottom insulator 17, and the top insulator 16 and the bottom insulator 17 constitute the housing 12.

Four plug contacts 13 are placed on the −Z direction side of the top insulator 16, and the sheet-like conductive member 15 is placed on the −Z direction side of the four plug contacts 13. One inner contact 18 is placed on the −Z direction side of the sheet-like conductive member 15, and the bottom insulator 17 is placed on the −Z direction side of the inner contact 18. The inner contact 18 corresponds to, among the four plug contacts 13, one plug contact 13 located on the −X direction side and the −Y direction side.

The top insulator 16 and the bottom insulator 17, the four plug contacts 13, and the one inner contact 18 constitute the connector 11.

Figure 3:
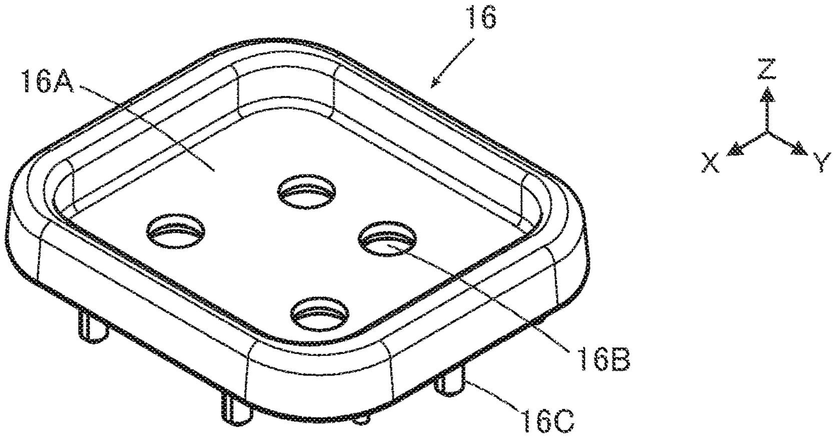
FIG. 3 is a perspective view showing a top insulator used for a connector of the embodiment.

As shown in FIG. 3, the top insulator 16 has a recess 16A opened in the +Z direction and four contact through holes 16B formed in the recess 16A. The recess 16A constitutes an other-side connector accommodating portion in which part of a not-illustrated other-side connector is accommodated, and the four contact through holes 16B correspond to the four plug contacts 13. A plurality of bosses 16C protruding in the −Z direction are formed on the surface oriented in the −Z direction of the top insulator 16.

Figure 4:
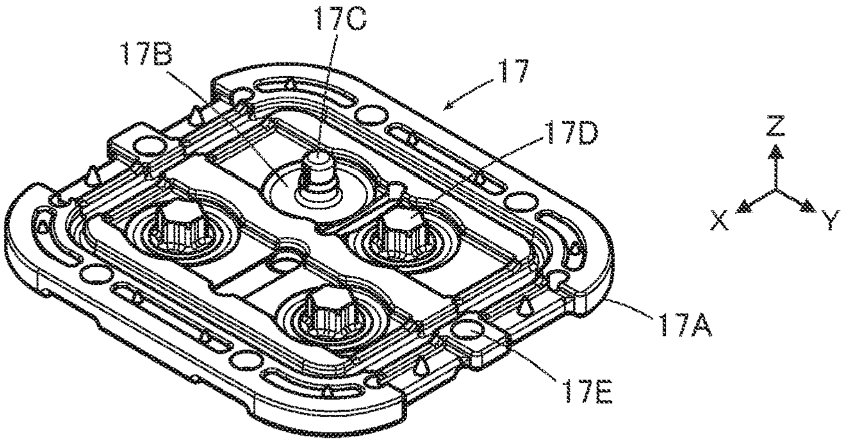
FIG. 4 is a perspective view showing a bottom insulator used for the connector of the embodiment.

As shown in FIG. 4, the bottom insulator 17 has a flat plate portion 17A, and four circular recesses 17B opened in the +Z direction are formed in the flat plate portion 17A. The four recesses 17B correspond to the four plug contacts 13. An inner contact temporary holding unit 17C protruding in the +Z direction is formed in, among the four recesses 17B, one recess 17B located on the −X direction side and the −Y direction side, and three protrusions 17D protruding in the +Z direction are formed individually in the other three recesses 17B.

A plurality of through holes 17E corresponding to the plurality of bosses 16C of the top insulator 16 are formed in the flat plate portion 17A.

Figure 5:
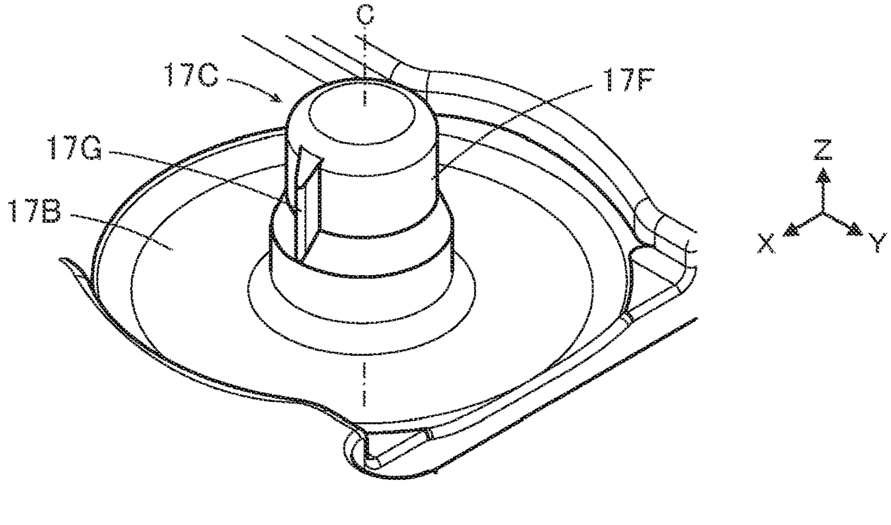
FIG. 5 is a perspective view showing an inner contact temporary holding unit formed on the bottom insulator.
Figure 6:
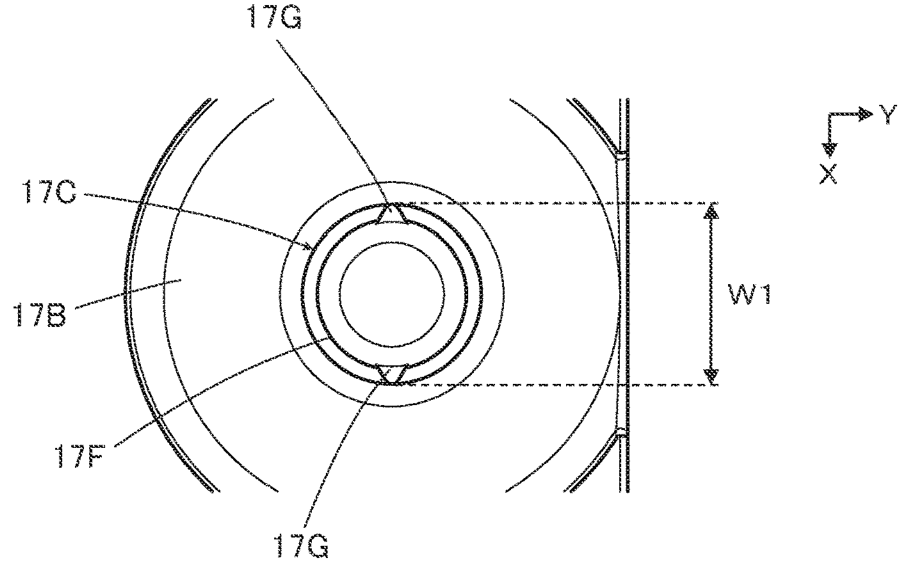
FIG. 6 is a plan view showing the inner contact temporary holding unit formed on the bottom insulator.

As shown in FIG. 5, the inner contact temporary holding unit 17C formed in the recess 17B located on the −X direction side and the −Y direction side of the bottom insulator 17 has a columnar portion 17F extending in the Z direction and a pair of temporary holding pieces 17G protruding in the +X direction and the −X direction from an outer peripheral portion of the columnar portion 17F. As shown in FIG. 6, in a portion where the pair of temporary holding pieces 17G are formed, the inner contact temporary holding unit 17C has a width W1 in the X direction.

Figure 7:
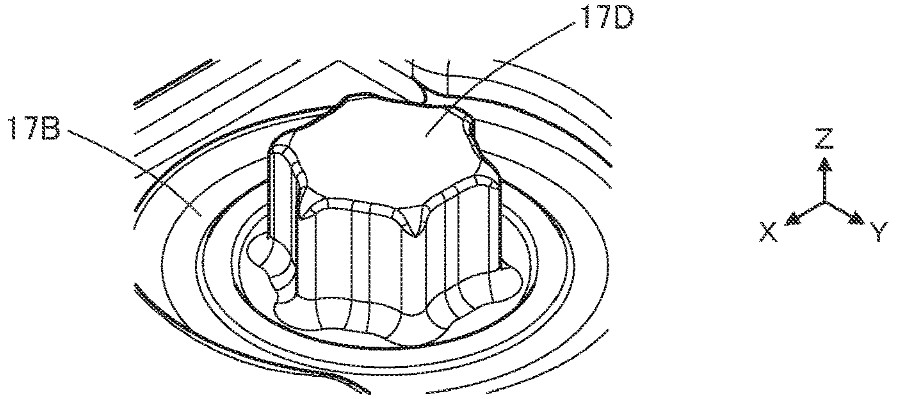
FIG. 7 is a perspective view showing a protrusion formed on the bottom insulator.

As shown in FIG. 7, each of the protrusions 17D formed in the other three recesses 17B has a substantially regular hexagonal prism shape extending in the Z direction.

Each of the four plug contacts 13 is formed of a conductive material such as metal, and is connected to the corresponding contact of the other-side connector when part of the not-illustrated other-side connector is accommodated in the recess 16A of the top insulator 16.

Figure 8:
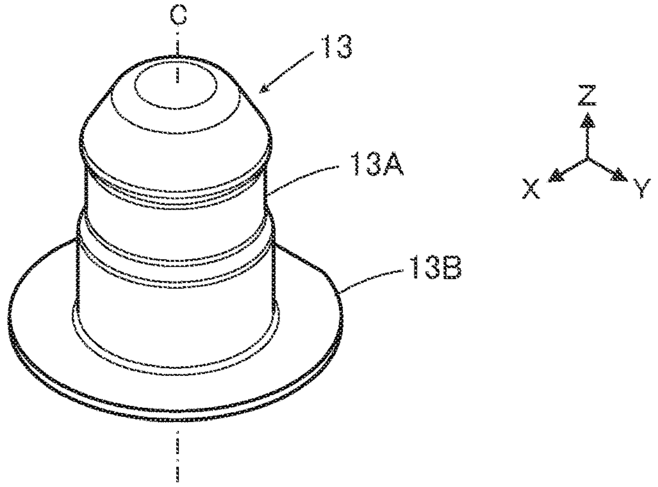
FIG. 8 is a perspective view showing a plug contact used for the connector of the embodiment.
Figure 9:
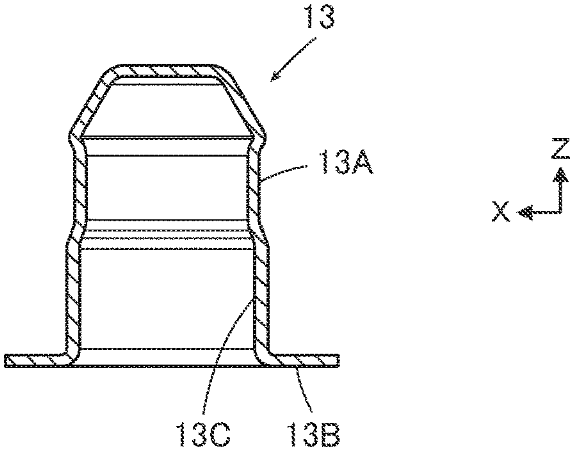
FIG. 9 is a cross-sectional view showing the plug contact used for the connector of the embodiment.

As shown in FIG. 8, the plug contact 13 has a cylindrical portion 13A in a circular cylindrical shape extending in the Z direction along a fitting axis C and a first flange 13B spreading along the XY plane from an end portion in the −Z direction of the cylindrical portion 13A. As shown in FIG. 9, a recess 13C opened in the −Z direction is formed in the interior of the cylindrical portion 13A.

The fitting axis C is an axis passing through the center of the cylindrical portion 13A and extending in the direction of fitting of the connector 11 and the other-side connector.

Although the cylindrical portion 13A has a circular cylindrical shape, the cross-sectional shape is not limited to a circular shape but may have various cross-sectional shapes such as an ellipse and a polygon as long as the cylindrical portion has the recess 13C in its interior.

Among the four plug contacts 13, one plug contact 13 located on the −X direction side and the −Y direction side is connected to the ground potential and used as a shield terminal, and the other three plug contacts 13 are each used as a signal terminal for transmitting an electric signal.

Figure 10:
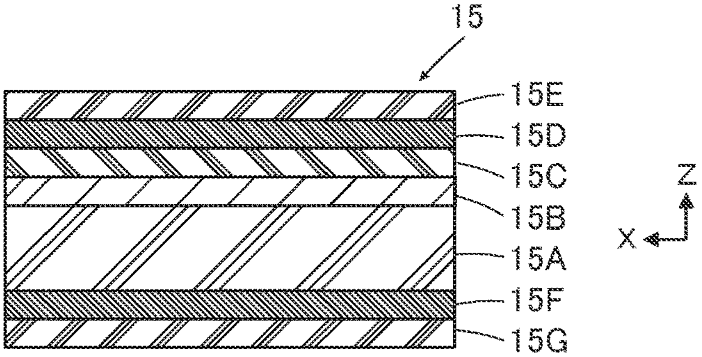
FIG. 10 is a cross-sectional view showing a connection target used in the connector assembly according to the embodiment.

As shown in FIG. 10, the sheet-like conductive member 15 has a sheet main body 15A made of an insulating material, and has a multilayer structure in which a signal wiring layer 15B formed of a flexible conductor, an insulating layer 15C, a shield layer 15D formed of a flexible conductor, and an insulating layer 15E are sequentially stacked on the front surface oriented in the +Z direction of the sheet main body 15A and a shield layer 15F formed of a flexible conductor and an insulating layer 15G are sequentially stacked on the back surface oriented in the −Z direction of the sheet main body 15A.

Figure 11:
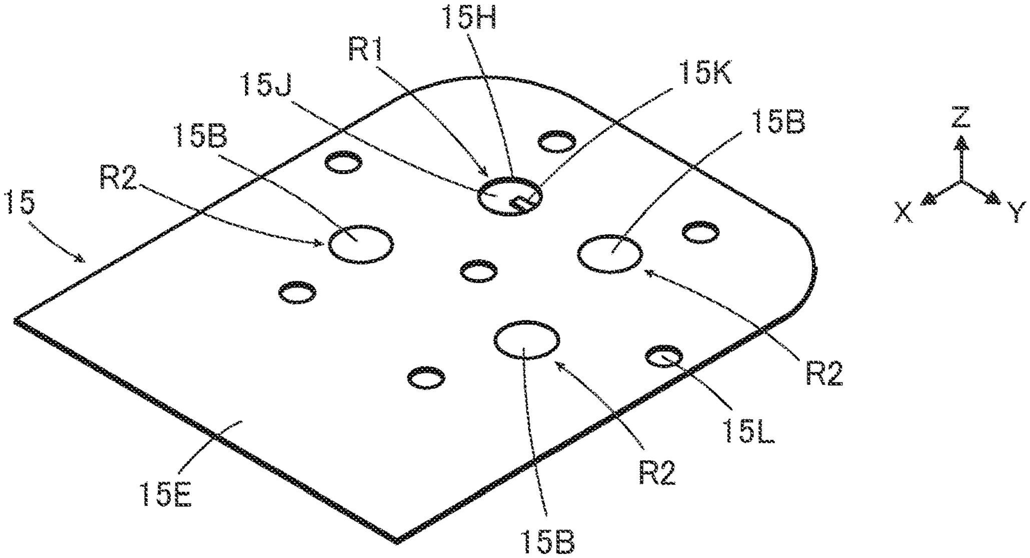
FIG. 11 is a perspective view of the connection target used in the connector assembly according to the embodiment as viewed obliquely from above.

As shown in FIG. 11, four contact placement regions 15H for placing the four plug contacts 13 are defined on the surface oriented in the +Z direction of the sheet-like conductive member 15. Among the four contact placement regions 15H, one contact placement region 15H located on the −X direction side and the −Y direction side forms a region R1 where the plug contact 13 used as a shield terminal is placed, and the remaining three contact placement regions 15H each form a region R2 where the plug contact 13 used as a signal terminal is placed.

The sheet-like conductive member 15 has a circular opening 15J formed in region R1. The opening 15J corresponds to the recess 13C of the plug contact 13, and penetrates the sheet-like conductive member 15 in the Z direction. Further, the sheet-like conductive member 15 has a substantially rectangular protruding portion 15K protruding from an edge portion of the opening 15J into the opening 15J.

On the other hand, in each of the three regions R2 placed on the surface oriented in the +Z direction of the sheet-like conductive member 15, the signal wiring layer 15B is exposed in the +Z direction by removing the insulating layer 15E, the shield layer 15D, and the insulating layer 15C.

Further, the insulating layer 15E is exposed in the region other than regions R1 and R2.

A plurality of through holes 15L corresponding to the plurality of bosses 16C of the top insulator 16 are formed in a peripheral edge portion of the sheet-like conductive member 15.

Figure 12:
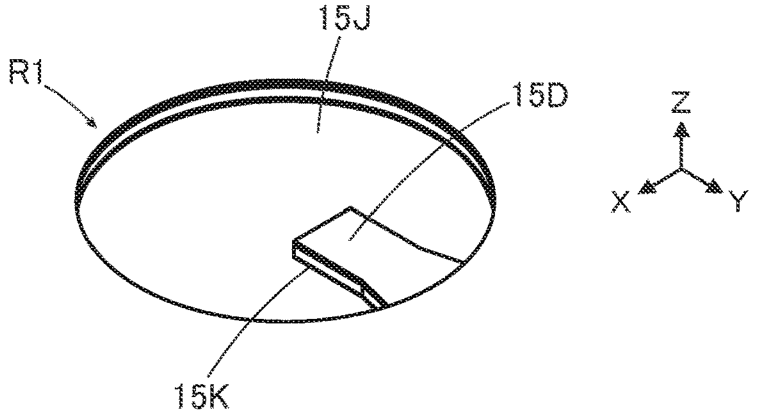
FIG. 12 is a perspective view of an opening and a protruding portion of the connection target as viewed obliquely from above.

As shown in FIG. 12, the protruding portion 15K in region R1 protrudes in the −Y direction from an edge portion on the +Y direction side of the opening 15J into the opening 15J, and in the protruding portion 15K, the shield layer 15D is exposed in the +Z direction by removing the insulating layer 15E.

Figure 13:
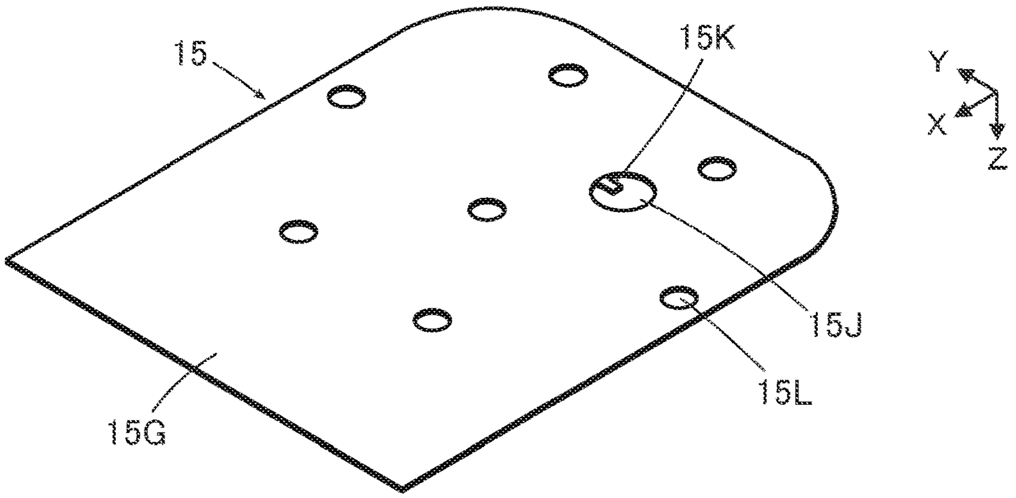
FIG. 13 is a perspective view of the connection target used for the connector assembly according to the embodiment as viewed obliquely from below.

Since the opening 15J penetrates the sheet-like conductive member 15 in the Z direction, as shown in FIG. 13, the opening 15J and the protruding portion 15K are seen in a position corresponding to region R1 also on the back surface oriented in the −Z direction of the sheet-like conductive member 15.

Figure 14:
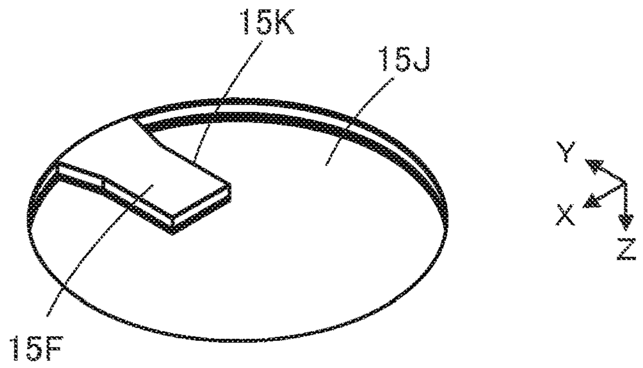
FIG. 14 is a perspective view of the opening and the protruding portion of the connection target as viewed obliquely from below.

On the back surface oriented in the −Z direction of the sheet-like conductive member 15, the insulating layer 15G is exposed in the region other than the position corresponding to region R1. Further, as shown in FIG. 14, in the protruding portion 15K, the shield layer 15F is exposed in the −Z direction by removing the insulating layer 15G.

Figure 15:
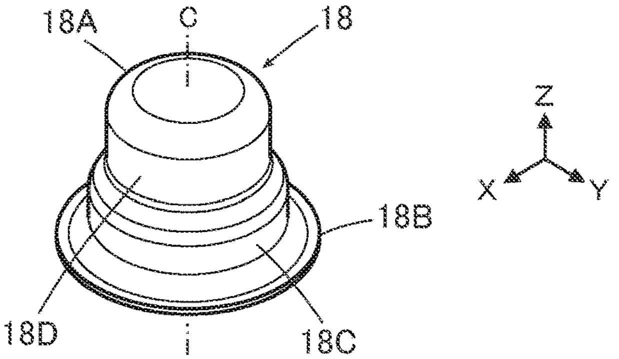
FIG. 15 is a perspective view showing an inner contact used for the connector of the embodiment.
Figure 16:
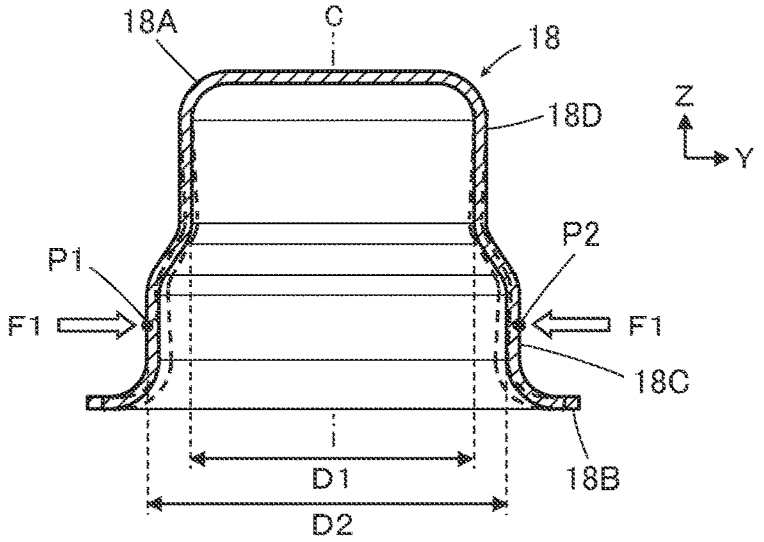
FIG. 16 is a cross-sectional view showing the inner contact used for the connector of the embodiment.

FIGS. 15 and 16 show a configuration of the inner contact 18. The inner contact 18 is formed of a conductive material such as metal, and has a cylindrical, elastically deformable insertion portion 18A through which the fitting axis C passes and a second flange 18B spreading along the XY plane from an end portion in the −Z direction of the insertion portion 18A. The insertion portion 18A is to be inserted into the recess 13C of the plug contact 13 through the opening 15J in region R1 of the sheet-like conductive member 15, and has a large-diameter portion 18C placed on the −Z direction side and a small-diameter portion 18D joined to the +Z direction side of the large-diameter portion 18C. Each of the large-diameter portion 18C and the small-diameter portion 18D has a circular cylindrical shape with the center at the fitting axis C, and the small-diameter portion 18D has a diameter smaller than the large-diameter portion 18C.

The inner diameter D1 of the small-diameter portion 18D is formed slightly smaller than the width W1 in the X direction of the inner contact temporary holding unit 17C in a portion of the bottom insulator 17 where the pair of temporary holding pieces 17G are formed as shown in FIG. 6.

Therefore, by putting the insertion portion 18A of the inner contact 18 on the inner contact temporary holding unit 17C of the bottom insulator 17, the pair of temporary holding pieces 17G of the inner contact temporary holding unit 17C are fitted to the interior of the small-diameter portion 18D, and the inner contact 18 can be temporarily held on the inner contact temporary holding unit 17C.

A contact portion P1 and a pressing portion P2 placed on opposite sides across the fitting axis C are formed on the outer peripheral surface of the large-diameter portion 18C. The contact portion P1 and the pressing portion P2 are placed in substantially the same position in the Z direction along the fitting axis C; the contact portion P1 is located on the −Y direction side, and the pressing portion P2 is located on the +Y direction side.

The spacing in the Y direction between the contact portion P1 and the pressing portion P2, that is, the outer diameter D2 of the large-diameter portion 18C is set slightly larger than a value obtained by subtracting the thickness of the sheet-like conductive member 15 from the inner diameter of a portion of the recess 13C with which the contact portion P1 and the pressing portion P2 come into contact when the inner contact 18 is inserted into the recess 13C of the plug contact 13.

The inner diameter of the large-diameter portion 18C is formed larger than the diameter or the width in the X direction of any portion of the inner contact temporary holding unit 17C.

As shown in FIG. 12, the protruding portion 15K in region R1 of the sheet-like conductive member 15 protrudes in the −Y direction from an edge portion on the +Y direction side of the opening 15J. Therefore, when the inner contact 18 is inserted into the recess 13C of the plug contact 13 through the opening 15J of the sheet-like conductive member 15, the protruding portion 15K is pushed into the recess 13C by the inner contact 18 and sandwiched between the pressing portion P2 formed on the +Y direction side of the large-diameter portion 18C and the inner surface on the +Y direction side of the recess 13C, and the contact portion P1 formed on the −Y direction side of the large-diameter portion 18C comes into contact with the inner surface on the −Y direction side of the recess 13C.

Here, since the spacing in the Y direction between the contact portion P1 and the pressing portion P2 is set slightly larger than a value obtained by subtracting the thickness of the sheet-like conductive member 15 from the inner diameter of a portion of the recess 13C with which the contact portion P1 and the pressing portion P2 come into contact when the inner contact 18 is inserted into the recess 13C of the plug contact 13, each of the contact portion P1 and the pressing portion P2 receives a force F1 in the Y direction from the inner surface of the recess 13C toward the fitting axis C, and as indicated by the broken line in FIG. 16, the insertion portion 18A of the inner contact 18 is elastically deformed such that the spacing in the Y direction between the contact portion P1 and the pressing portion P2 is narrowed.

Although each of the large-diameter portion 18C and the small-diameter portion 18D of the insertion portion 18A has a circular cylindrical shape with the center at the fitting axis C, the shape is not limited to a circular cylindrical shape, and may be any shape as long as it is, for example, a cylindrical shape having any of various cross-sectional shapes such as an ellipse and a polygon.

The four contact through holes 16B of the top insulator 16, the four plug contacts 13, the four contact placement regions 15H of the sheet-like conductive member 15, and the four recesses 17B of the bottom insulator 17 are placed in positions aligned with each other in the Z direction.

The inner contact 18 is placed in a position aligned in the Z direction with, among the four contact placement regions 15H of the sheet-like conductive member 15, the contact placement region 15H forming region R1 and located on the −X direction side and the −Y direction side and, among the four recesses 17B of the bottom insulator 17, the recess 17B located on the −X direction side and the −Y direction side where the inner contact temporary holding unit 17C is formed.

The plurality of bosses 16C of the top insulator 16, the plurality of through holes 15L of the sheet-like conductive member 15, and the plurality of through holes 17E of the bottom insulator 17 are placed in positions aligned with each other in the Z direction.

In assembling the connector assembly, first, the cylindrical portion 13A of each plug contact 13 is inserted from the −Z direction into the corresponding one of the four contact through holes 16B of the top insulator 16, and the sheet-like conductive member 15 is placed on the −Z direction side of the four plug contacts 13. At this time, the sheet-like conductive member 15 is placed such that the four contact placement regions 15H come into contact with the first flanges 13B of the four plug contacts 13.

Further, the insertion portion 18A of the inner contact 18 is put on the inner contact temporary holding unit 17C of the bottom insulator 17, and thereby the inner contact 18 is temporarily held on the inner contact temporary holding unit 17C.

In this state, the bottom insulator 17 is pressed in the +Z direction toward the top insulator 16.

Accordingly, the insertion portion 18A of the inner contact 18 temporarily held on the inner contact temporary holding unit 17C of the bottom insulator 17 is inserted into the recess 13C of the plug contact 13 through the opening 15J while pushing the protruding portion 15K of the sheet-like conductive member 15 until the sheet-like conductive member 15 is sandwiched between the first flange 13B of the plug contact 13 and the second flange 18B of the inner contact 18.

Further, the three protrusions 17D of the bottom insulator 17 are inserted individually into the recesses 13C of the corresponding plug contacts 13 while pushing regions R2 of the sheet-like conductive member 15.

At this time, region R2 of the sheet-like conductive member 15 is inserted into the recess 13C of the plug contact 13 while expanding due to the protrusion 17D of the bottom insulator 17; if the stretchability of the sheet-like conductive member 15 is not sufficient, it is desirable that a plurality of notches penetrating the sheet-like conductive member 15 in the Z direction be formed in each region R2 in advance. With this configuration, the protrusion 17D is inserted into the recess 13C of the plug contact 13 while opening the plurality of notches in region R2.

Figure 17:
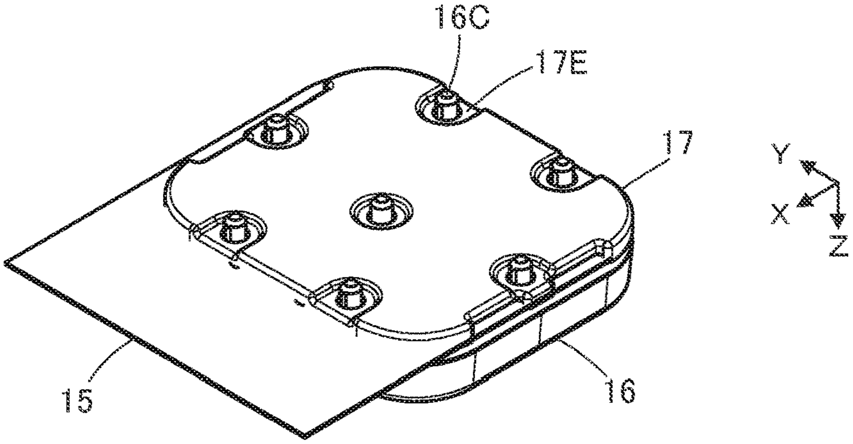
FIG. 17 is a perspective view of the connector assembly in the middle of assembly as viewed obliquely from below.

By pressing the bottom insulator 17 against the top insulator 16, the plurality of bosses 16C of the top insulator 16 sequentially penetrate the plurality of through holes 15L of the sheet-like conductive member 15 and the plurality of through holes 17E of the bottom insulator 17. Then, as shown in FIG. 17, the distal ends of the plurality of bosses 16C protruding on the −Z direction side of the bottom insulator 17 are thermally deformed, and thereby the top insulator 16 and the bottom insulator 17 are fixed to each other; thus, the assembly of the connector assembly is completed.

Each plug contact 13 is fixed to the top insulator 16 and the bottom insulator 17 by the first flange 13B being sandwiched between the top insulator 16 and the bottom insulator 17.

Figure 18:
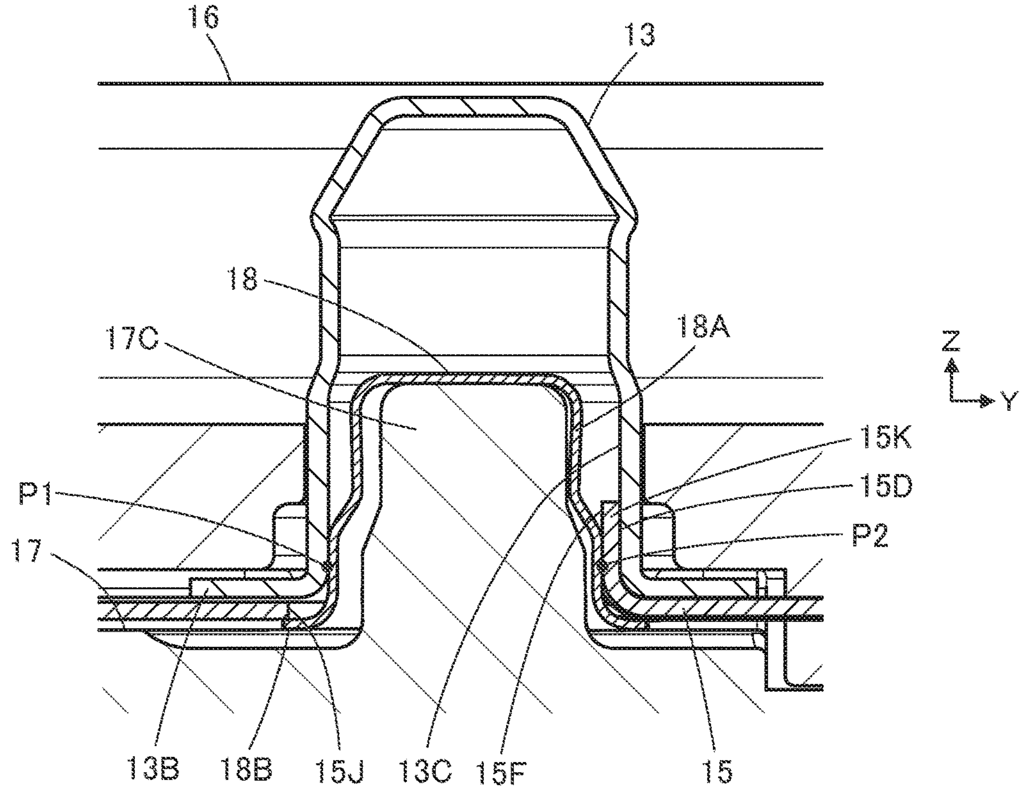
FIG. 18 is a partial cross-sectional view showing, in the connector assembly of the embodiment, a state in the plug contact into which the inner contact is inserted.

As shown in FIG. 18, in the plug contact 13 used as a shield terminal, the insertion portion 18A of the inner contact 18 is inserted into the recess 13C of the plug contact 13 while pushing the protruding portion 15K of the sheet-like conductive member 15. Consequently, the sheet-like conductive member 15 is sandwiched between the first flange 13B of the plug contact 13 and the second flange 18B of the inner contact 18.

Further, the protruding portion 15K protruding in the −Y direction from an edge portion on the +Y direction side of the opening 15J of the sheet-like conductive member 15 is sandwiched between the pressing portion P2 formed on the +Y direction side of the inner contact 18 and the inner surface on the +Y direction side of the recess 13C, and the contact portion P1 formed on the −Y direction side of the inner contact 18 comes into contact with the inner surface on the −Y direction side of the recess 13C.

Consequently, the insertion portion 18A of the inner contact 18 is elastically deformed such that the spacing in the Y direction between the contact portion P1 and the pressing portion P2 is narrowed, and the contact portion P1 of the inner contact 18 elastically comes into contact with the inner surface on the −Y direction side of the recess 13C of the plug contact 13; thus, the inner contact 18 is electrically connected to the plug contact 13.

Further, the protruding portion 15K of the sheet-like conductive member 15 sandwiched between the pressing portion P2 of the inner contact 18 and the inner surface on the +Y direction side of the recess 13C of the plug contact 13 is elastically pressed toward the inner surface on the +Y direction side of the recess 13C of the plug contact 13 by the pressing portion P2.

Here, as shown in FIGS. 12 and 14, in the protruding portion 15K, the shield layer 15D is exposed on the front surface side of the sheet-like conductive member 15, and the shield layer 15F is exposed on the back surface side of the sheet-like conductive member 15.

Therefore, the shield layer 15D on the front surface side of the protruding portion 15K comes into contact with the inner surface on the +Y direction side of the recess 13C of the plug contact 13 with a predetermined contact pressure, and the shield layer 15F on the back surface side of the protruding portion 15K comes into contact with the pressing portion P2 of the inner contact 18 with a predetermined contact pressure.

Accordingly, the shield layer 15D exposed on the front surface of the protruding portion 15K of the sheet-like conductive member 15 is directly electrically connected to the plug contact 13, and the shield layer 15F exposed on the back surface of the protruding portion 15K is electrically connected to the plug contact 13 via the inner contact 18. That is, both the shield layers 15D and 15F are connected to the plug contact 13 used as a shield terminal.

Thus, in the connector 11, by using the inner contact 18, both the shield layer 15D placed on the front surface side of the protruding portion 15K of the sheet-like conductive member 15 and the shield layer 15F placed on the back surface side can be electrically connected to one plug contact 13 placed in region R1.

Figure 19:
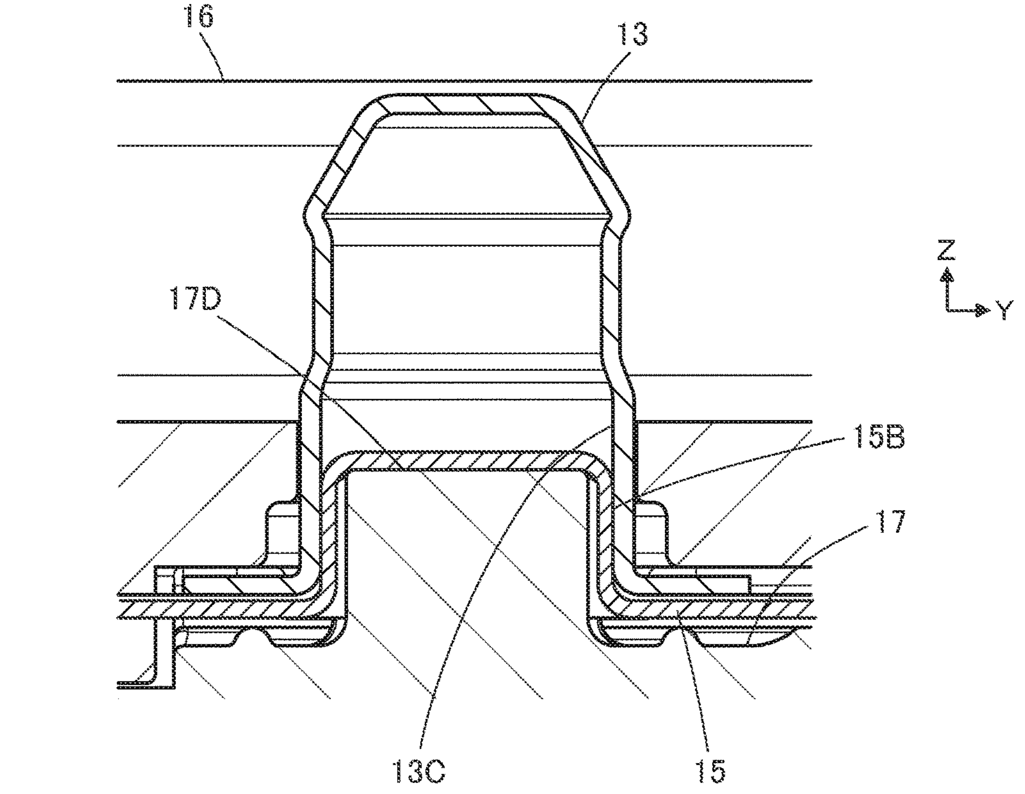
FIG. 19 is a partial cross-sectional view showing, in the connector assembly of the embodiment, a state in the plug contact into which the protrusion is inserted.
Figure 20:
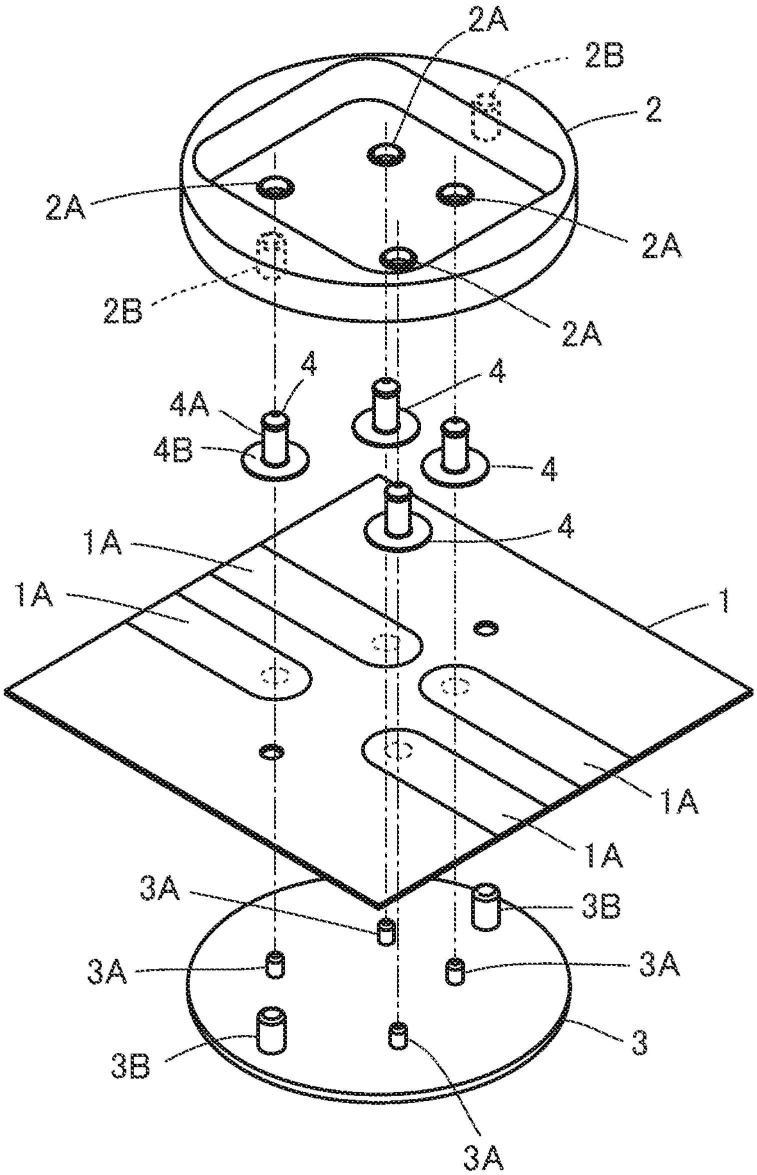
FIG. 20 PRIOR ART
FIG. 20 is an exploded perspective view of a conventional connector.
Figure 21:
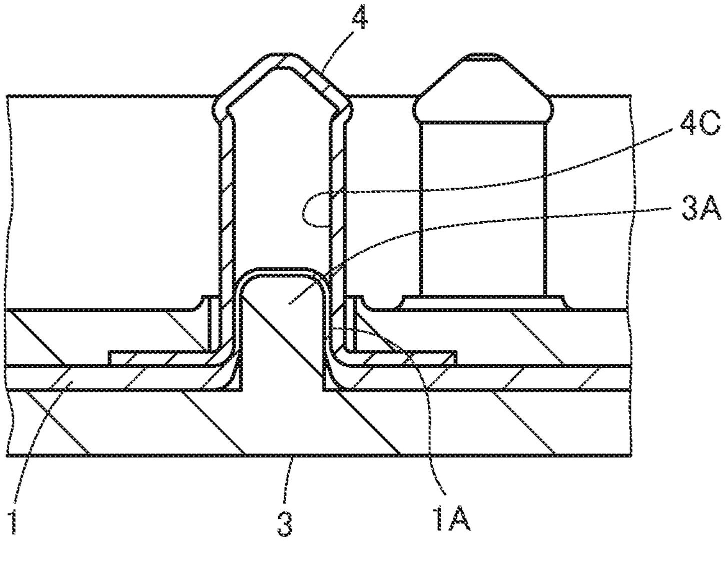
FIG. 21 PRIOR ART
FIG. 21 is a partial cross-sectional view showing the conventional connector.

On the other hand, in the three regions R2 where the three plug contacts 13 used as signal terminals are placed among the four contact placement regions 15H defined on the front surface of the sheet-like conductive member 15, each protrusion 17D of the bottom insulator 17 is inserted into the recess 13C of the plug contact 13 as shown in FIG. 19.

When the protrusion 17D of the bottom insulator 17 is inserted into the recess 13C of the corresponding plug contact 13 while pushing region R2 of the sheet-like conductive member 15, the sheet-like conductive member 15 pushed into the recess 13C is pressed toward the inner surface of the recess 13C of the plug contact 13 by the protrusion 17D.

Here, since the signal wiring layer 15B is exposed in region R2 on the front surface of the sheet-like conductive member 15 as shown in FIG. 11, the sheet-like conductive member 15 is sandwiched between the side surface of the protrusion 17D and the inner surface of the recess 13C of the plug contact 13, and the signal wiring layer 15B comes into contact with the inner surface of the recess 13C of the plug contact 13 with a predetermined contact pressure and is electrically connected to the plug contact 13 placed in region R2.

The signal wiring layer 15B has been subjected to predetermined patterning, and three wiring lines formed of the signal wiring layer 15B and insulated from each other are connected individually to the three plug contacts 13 placed in the three regions R2.

As shown in FIG. 10, the signal wiring layer 15B is stacked between the shield layer 15D placed on the front surface side of the sheet-like conductive member 15 and the shield layer 15F placed on the back surface side in a state of being insulated from these shield layers 15D and 15F; therefore, a shielding effect on the signal wiring layer 15B is exerted by connecting the plug contact 13 placed in region R1 and connected to the shield layer 15D and the shield layer 15F to the ground potential, and high-accuracy signal transmission in which the influence of disturbance due to electromagnetic waves or the like is suppressed can be performed.

Although in FIG. 16 the contact portion P1 and the pressing portion P2 are each shown as a point on the outer peripheral surface of the large-diameter portion 18C of the inner contact 18, a contact portion P1 and a pressing portion P2 extending linearly along the Z direction can be set because the large-diameter portion 18C has a circular cylindrical shape with the center at the fitting axis C.

Although in the above embodiment the protruding portion 15K of the sheet-like conductive member 15 has a substantially rectangular shape protruding from an edge portion of the opening 15J into the opening 15J, the shape of the protruding portion is not limited to the shape of the protruding portion 15K as long as the protruding portion is one that, when the insertion portion 18A of the inner contact 18 is being inserted into the recess 13C of the plug contact 13, is pushed into the recess 13C together with the insertion portion 18A and is sandwiched between the pressing portion P2 of the insertion portion 18A and the inner surface of the recess 13C.

Further, although in the above embodiment the sheet-like conductive member 15 has one protruding portion 15K protruding into the opening 15J, the number of protruding portions 15K is not limited to one, and also a configuration is possible in which two or more protruding portions 15K protrude from an edge portion of the opening 15J into the opening 15J and these two or more protruding portions 15K are sandwiched between the pressing portion P2 of the insertion portion 18A and the inner surface of the recess 13C.

Further, in the above embodiment, in assembling the connector assembly, the bottom insulator 17 is pressed toward the top insulator 16 after the inner contact 18 is temporarily held on the inner contact temporary holding unit 17C of the bottom insulator 17; however, it is not always necessary to temporarily hold the inner contact 18 on the inner contact temporary holding unit 17C.

For example, also the following method is possible: the cylindrical portions 13A of the plug contacts 13 are inserted into the corresponding four contact through holes 16B of the top insulator 16, and the sheet-like conductive member 15 is placed on the −Z direction side of the four plug contacts 13; in this state, the insertion portion 18A of the inner contact 18 is inserted into the recess 13C of the plug contact 13 placed in region R1 of the sheet-like conductive member 15 while pushing the protruding portion 15K, and then the bottom insulator 17 is pressed toward the top insulator 16. By this method, the inner contact temporary holding unit 17C of the bottom insulator 17 becomes unnecessary.

In the above embodiment, the plug contact 13 placed in region R1 of the sheet-like conductive member 15 is connected to both the shield layer 15D exposed on the front surface side of the sheet-like conductive member 15 and the shield layer 15F exposed on the back surface side of the sheet-like conductive member 15; however, for example, also a configuration is possible in which only the shield layer 15F exposed on the back surface side of the sheet-like conductive member 15 is connected to the plug contact 13 placed in region R1.

Although the sheet-like conductive member 15 used in the above embodiment has the multilayer structure shown in FIG. 10, the sheet-like conductive member is not limited thereto, and may have any structure as long as it has at least a flexible conductor placed on at least one surface of the sheet main body.

Further, although in the above embodiment the two conductive layers of the shield layer 15D and the shield layer 15F of the sheet-like conductive member 15 are connected to one plug contact 13 used as a shield terminal, the configuration is not limited thereto, and three or more conductive layers may be connected to one plug contact 13.

Further, although the connector 11 in the above embodiment includes four plug contacts 13 including a contact used as a shield terminal and a contact used as a signal terminal, the configuration is not limited to this number of plug contacts 13, and may be any configuration as long as it includes at least one plug contact 13 to be electrically connected to a flexible conductor placed on the front surface side or the back surface side of the sheet main body of the sheet-like conductive member 15.

Although in the connector 11 in the embodiment the sheet-like conductive member 15 is directly placed on the −Z direction side of the top insulator 16, a not-illustrated reinforcing sheet made of an insulating material may be placed between the top insulator 16 and the sheet-like conductive member 15. The reinforcing sheet has an opening formed at the center, and the four plug contacts 13 are inserted into the four contact through holes 16B of the top insulator 16 through the opening. By using such a reinforcing sheet, a mounting target such as a garment to which the connector 11 is attached can be reinforced.

What is claimed is:

1. A connector comprising:

a plug contact in a cylindrical shape having conductivity and having a recess extending along a fitting axis; and an inner contact having conductivity and having an insertion portion in a cylindrical shape which is elastically deformable, which is inserted into the recess, and through which the fitting axis passes, wherein the insertion portion includes: a contact portion that is placed on an outer peripheral surface of the insertion portion and that comes into contact with the plug contact in the recess; and a pressing portion placed on the outer peripheral surface of the insertion portion and on an opposite side to the contact portion across the fitting axis, wherein part of a sheet-like connection target having a flexible conductor exposed on at least one surface is sandwiched between the pressing portion and an inner surface of the recess in a direction orthogonal to the fitting axis, the inner surface of the recess comes into contact with a front surface of the connection target, and the pressing portion comes into contact with a back surface of the connection target, whereby the plug contact is directly electrically connected to the flexible conductor in a case where the flexible conductor is exposed on the front surface of the connection target, and the plug contact is electrically connected to the flexible conductor via the inner contact in a case where the flexible conductor is exposed on the back surface of the connection target, wherein the insertion portion includes the contact portion and the pressing portion that are formed in the same position in a direction along the fitting axis, and wherein, by part of the connection target being sandwiched between the pressing portion and the inner surface of the recess, the insertion portion is elastically deformed such that a spacing between the contact portion and the pressing portion is narrowed, and the contact portion elastically comes into contact with the inner surface of the recess, while the pressing portion elastically presses the part of the connection target toward the inner surface of the recess.

2. The connector according to claim 1, wherein the plug contact includes a cylindrical portion and a first flange formed at one end of the cylindrical portion, the inner contact includes a second flange formed at one end of the insertion portion and placed to be stacked with the first flange, the recess is formed of an interior of the cylindrical portion, and the connection target is sandwiched between the first flange and the second flange.

3. The connector according to claim 2, comprising a housing having an insulating property and configured to hold the connection target, the plug contact, and the inner contact, wherein the housing includes:

a top insulator provided with a contact through hole that is penetrated by the cylindrical portion of the plug contact and that is smaller than the first flange; and a bottom insulator, and the top insulator is fixed to the bottom insulator such that the cylindrical portion of the plug contact penetrates the contact through hole and that the connection target, the first flange, and the second flange are sandwiched between the top insulator and the bottom insulator.

4. The connector according to claim 3, wherein the bottom insulator includes an inner contact temporary holding unit that is inserted into an interior of the insertion portion of the inner contact and that temporarily holds the inner contact.

5. The connector according to claim 4, wherein the inner contact temporary holding unit includes: a columnar portion extending along the fitting axis; and a pair of temporary holding pieces protruding from an outer peripheral portion of the columnar portion in a direction that is orthogonal to the fitting axis and that is orthogonal to the contact portion and the pressing portion around the fitting axis, and the inner contact is temporarily held on the bottom insulator by putting the insertion portion on the inner contact temporary holding unit.

6. The connector according to claim 5, wherein the insertion portion of the inner contact includes: a large-diameter portion having a circular cylindrical shape with a center at the fitting axis; and a small-diameter portion joined to the large-diameter portion and having a circular cylindrical shape with a center at the fitting axis, the inner contact is temporarily held on the bottom insulator by the pair of temporary holding pieces being fitted to an interior of the small-diameter portion, and the contact portion and the pressing portion are placed on an outer peripheral surface of the large-diameter portion.

7. A connector assembly comprising:

the connection target; and the connector according to claim 1 connected to the connection target, wherein the connection target includes: an opening corresponding to the recess of the plug contact; and a protruding portion protruding from an edge portion of the opening into the opening, and the insertion portion is inserted into the recess through the opening while pushing the protruding portion, and the protruding portion, as part of the connection target, is sandwiched between the pressing portion and an inner surface of the recess.

* * * * *